UNITED STATES PATENT OFFICE 2,630,456

PREPARATION OF ORGANIC HYDROPEROXIDES

Edward R. Bell and William E. Vaughan, Berkeley, Calif., assignors to Shell Development Company, San Francisco, Calif., a corporation of Delaware No Drawing. Application July 1, 1949,
Serial No. 102,717

9 Claims. (Cl. 260—610)

This invention relates to a process for the preparation of peroxidic compounds, and it more particularly relates to a process for the preparation of hydroperoxides having directly linked to the hydroperoxy radical an organic radical which contains a tertiary carbon atom and is directly linked to the hydroperoxy radical by a bond of a tertiary carbon atom. Still more particularly, the present invention relates to an improved process for the production of tertiary-alkyl hydroperoxides, which are specifically exemplified by tertiary-butyl hydroperoxide, from hydrogen peroxide, and the tertiary-alkyl alcohol corresponding to the tertiary-alkyl hydroperoxide which is to be produced, which process is characterized, inter alia, by the improved, substantially quantitative yields of the desired tertiary-alkyl hydroperoxide, by the minimal formation of undesired products of side reaction, and by the more efficient utilization of the expensive hydrogen peroxide reagent relative to the known processes which employ hydrogen peroxide for or in the manufacture of tertiary-alkyl hydroperoxides.

It is known to produce certain alkyl hydroperoxides by reacting pure neutral dialkyl sulfates with hydrogen peroxide in the presence of an alkali. The known processes of this character have suffered from the disadvantage of the difficulty and expense of preparing or obtaining a pure neutral dialkyl sulfate, as well as from the hazards associated with use of these extremely toxic chemicals. The known processes of this character have formed alkyl hydroperoxides in low yields and in a crude form which is difficult to purify, and such processes have not been found to be suited to the manufacture of tertiary-alkyl hydroperoxides.

It is further known that certain alkyl hydroperoxide compounds can be prepared by treatment of an alcohol, such as a tertiary-alkyl alcohol, with hydrogen peroxide in the presence of a solid dehydrating agent, such as sodium sulfate (see U. S. Patent 2,176,407, and also Journal of the American Chemical Society, volume 60, pages 2434 to 2436, October, 1938). It also is known to produce alkyl hydroperoxides by forming the mono-alkyl hydrogen sulfate, for example by reacting isobutylene with an equivalent amount of a strong aqueous solution of sulfuric acid, reacting the mono-alkyl hydrogen sulfate thus formed with hydrogen peroxide, neutralizing the reaction mixture, and recovering the alkyl hydroperoxide. The method and various embodiments thereof are as described in the following patent and literature articles: U. S. Patent 2,223,807, to Milas; Journal of the American Chemical Society, volume 68, pages 205 to 208 (February, 1946), pages 643 to 644 (April 1946), and pages 1938 to 1940 (October 1946).

A principal object of the present invention is a new and improved process for the preparation of hydroperoxide compounds, particularly alkyl hydroperoxides of the tertiary-alkyl variety. Another important object is such a process wherein hydrogen peroxide is a reactant and there are obtained substantially improved efficiencies in the conversion of this expensive reagent to desired hydroperoxide product. A process for the direct preparation from hydrogen peroxide and tertiary alcohols of pure or substantially pure tertiary-alkyl hydroperoxides is another object of the invention. A further object of the invention is a process for the preparation of tertiary-alkyl hydroperoxides whereby there is obtained reduced formation of undesired by-products and greater selectivity in the conversion of the hydrogen peroxide reactants to desired product than are obtained by the prior art processes. New catalysts for effecting reaction between hydrogen peroxide and alcohols to produce organic hydroperoxides form another object of the invention. Still another object of the invention is a process of the character herein defined, characterized by use of shorter reaction times, smaller amounts of catalyst, and more efficient manipulative procedures than have been attained in the prior art processes. A specific object of the invention is a new and improved process for the preparation of tertiary-butyl hydroperoxide. Other objects of the invention will become apparent from the nature of the disclosure and claims hereinafter.

The foregoing and the related objects now have been accomplished in accordance with the invention by the catalyzed reaction of alcohols, preferably alcohols of the tertiary-alkyl variety, with hydrogen peroxide in the presence of critical, regulated, small amounts of acidic catalysts, the reaction being effected by mixing the alcohol reactant, hydrogen peroxide, which conveniently may be applied in the form of an aqueous solution having a concentration of about 50% by weight of $H_2O_2$, and a controlled small amount of an acidic catalyst, i. e., a strong acid or a substance which generates strong acid in situ, conducting the reaction in liquid phase at a temperature desirably within the range of from about 40° C. to about 70° C., and after reaction has occurred, recovering the organic hydroperoxide compound produced as substantially the sole product formed by the reaction.

The present invention is based in part upon the discovery that the amount of acid, when present in critical small amounts during the course of the reaction between the alcohol and the hydrogen peroxide, has an advantageous and unforeseen influence upon the direction of the reaction, as well as upon its extent. It appears to be probable that, in contrast to the known processes for the preparation of organic hydroperoxides from alcohols (or corresponding olefins) via the sulfate compound and hydrogen peroxide, there is accomplished in the process conducted according to the present invention in the presence of the critical, small, regulated amounts of an acidic catalyst an acid-catalyzed reaction between the alcohol and the hydrogen peroxide which leads to exchange of the hydroperoxy radical (—O—O—H) of the hydrogen peroxide and the hydroxy radical (—O—H) of the alcoholic reactant, which reaction results in selective formation of the desired hydroperoxide compound to the substantial exclusion of products of other or side reactions. As the acidic catalyst for effecting such conversion, there is employed any strongly acidic substance or substance which generates strong acid in situ. One valuable group of strong acids which can be used, and which are of particular interest because of the very small amounts that need be employed, are the heteropoly acids, i. e., those inorganic acids which contain a plurality of acidic radicals and which include an acidic radical of at least one metal element and an acidic radical of at least one other, preferably non-metallic element. Heteropoly acids, which are employed in accordance with one aspect of the present invention, are inorganic complexes of high molecular weight, comprising a nuclear element which is usually phosphorus, silicon, boron, or arsenic, surrounded by a coordinated group of other metallic oxide or oxides, such as one or more of the oxides of tungsten, molybdenum, vanadium, chromium, sulfur, selenium, and tellurium. The complex may be associated with varying, and at times indeterminate, amounts of combined water and water of hydration, and with the associated water may have a molecular weight up to 3000 or more. Since the heteropoly acids are generally polybasic or polyvalent in character, having a plurality, frequently from 4 to 10, of acid or available hydrogen atoms, partial salts of the heteropoly acids, i. e., acid salts or salts in which only a portion of the acid groups are combined with alkali, retain acid characteristics due to the residual or unneutralized acid hydrogen atoms. Such partial salts may also be employed and are included in the general term heteropolyacid compounds. In general, the heteropoly acids are water-soluble; likewise are their suitable partial salts, e. g., with ammonium, the alkali metals, etc. A characteristic property of the heteropoly acids is their solubility in ether; so much so that even when merely stored over this solvent they often dissolve.

The structure of the heteropoly acids appears to be very complex. At least, up to the present time it has not been conclusively determined. Thus, certain recent investigators have assigned to silicomolybdic acid the structure which would be represented by the formula $$H_4[SiO_4Mo_{12}O_{18}(OH)_{36}]$$

and have regarded the atom of silicon associated with four atoms of oxygen as being a central core or nucleus surrounded by a coordinated structure composed of twelve $MoO_6$ octahedra, each of which shares three corners or oxygen atoms with adjoining octahedra and has three unshared corners or oxygen atoms, and with which are associated in all thirty-six atoms of hydrogen. Corresponding structures have been considered for silicotungstic acid, $$H_4[SiO_4W_{12}O_{18}(OH)_{36}]$$

phosphotungstic acid, $H_4[PO_4W_{12}O_{18}(OH)_{36}]$; borotungstic acid, $H_5[BO_4W_{12}O_{18}(OH)_{36}]$ as well as for metatungstic acid, $H_6[H_2O_4W_{12}O_{18}(OH)_{36}]$. In the iso forms, e. g., in iso-silicotungstic and iso-borotungstic acid, it has been regarded as being probable that two of the complex anions of the normal acids are condensed with liberation of water of constitution to form complexes corresponding generally to the formulas $$H_8[(SiO_4)_2W_{24}O_{42}(OH)_{60}]$$

and $$H_{10}[(BO_4)_2W_{24}O_{42}(OH)_{60}],$$

or $H_4[SiW_{12}O_{40}]\cdot 15H_2O$ and $H_5[BW_{12}O_{40}]\cdot 15H_2O$, respectively.

Other investigators have postulated that the heteropoly acids have structures represented by the formula $H_3[PO_4(W_3O_9)_4]$ for phosphotungstic acid, $H_3[PO_4(Mo_3O_9)_4]$ for phosphomolybdic acid, $H_3[AsO_4(Mo_3O_9)_4]$ for arsenomolybdic acid, $H_4[SiO_4(Mo_3O_9)_4]$ for silicomolybdic acid, $$H_4[MnO_4(Mo_3O_9)_4]$$

for manganimolybdic acid, $H_4[TiO_4(Mo_3O_9)_4]$ for titanimolybdic acid, $H_4[GeO_4(W_3O_9)_4]$ for germanitungstic acid, and $H_3[AsO_4(W_3O_9)_4]$ for arsenitungstic acid, with each of which in the hydrated form there is associated an indeterminate number $x$ molecules of water, as in the structure for hydrated silicotungstic acid $$H_3[SiO_4(W_3O_9)_4]\cdot xH_2O,$$

$x$ having a value up to even 24 or possibly more.

In still another case, the heteropoly acids have been regarded in accordance with Werner's coordination theory as being composed in the anionic radical of the central atom X, such as silicon, phosphorous, etc., surrounded by up to six like or unlike radicals of the formulas $W_2O_7$, $Mo_2O_7$, and $V_2O_6$. On this basis, the formula $H_7[P(Mo_2O_7)_6]\cdot xH_2O$ is obtained for phosphomolybdic acid, and analogous formulas apply to other heteropoly acids. The existence of the radicals $W_2O_7$, $Mo_2O_7$ and $V_2O_6$ is considered doubtful, however, and formulas of this type have been stated to be at variance with the chemical properties of the acids themselves.

While various formulas have been proposed to represent the structures of the heteropoly acids, as a class the heteropoly acids (as well as their acid salts) are generally represented as containing the central tetrahedral group $XO_4$ as an essential feature, where X represents, for example, P, As, B, Th, Si, Sn, Ce, Zr, and Ti, associated with the radical or radicals of one or more dissimilar acid or acids. It is distinctive of heteropolyacids that a single radical of one of the acids is associated with many radicals derived from a second acid, usually and preferably a radical or radicals of vanadic, tungstic and/or molybdic acids.

While any of the foregoing general class of heteropoly acids may be employed in accordance with one aspect of the present invention, it in general is preferred to employ those of the limiting series, which are the heteropoly acids in which the nuclear radical, represented above by $XO_4$, is combined with the maximum possible number of surrounding radicals determined on the basis of a coordination number equal to six, and preferably of the saturated type or having twelve coordinated groups represented by $(MO_x)$, where M is the atom of vanadium, tungsten, or molybdenum, for each nuclear atom X. Without determining here that the double radicals $W_2O_7$, $Mo_2O_7$, and $V_2O_6$ do exist, this limitation corresponds to the maximum of six groups represented by one or more than one of $W_2O_7$, $Mo_2O_7$ and $V_2O_6$ associated with each central atom X.

Insofar as we are aware, it had not been known prior to this invention that alcohols and hydrogen peroxide could be reacted in the presence of heteropolyacid compounds to produce alkyl hydroperoxides. The use, broadly considered, of these new catalysts in the synthesis of peroxidic compounds from alcohols and hydrogen peroxide forms an important aspect of the present invention.

While the heteropolyacid compounds have been found to be especially efficacious as catalysts for the reaction of alcohols with hydrogen peroxide to produce according to the process of the invention valuable alkyl hydroperoxides, other acidic catalysts may be employed according to the invention. A group of catalysts which are in general readily obtainable at low cost or can be simply prepared are the halide-type Friedel-Crafts catalysts, including the boron halides, especially boron trifluoride and boron trichloride, and the halides of amphoteric polyvalent metals, especially the chlorides of aluminum, iron, antimony, tin, titanium, and the like, specifically aluminum trichloride, ferric chloride, antimony trichloride, stannic chloride, and antimony tetrachloride.

A further group of catalysts which may be employed according to the process of the invention comprises strong acids, which may be organic in character or preferably inorganic in character. Illustrative strong organic acids include the strong carboxylic acids, such as oxalic acid, monochloroacetic acid, dichloroacetic acid, trichloroacetic acid, etc., as well as strong organic acids containing an inorganic acidic radical, such as the sulfo radical, as in the aryl sulfonic acids, the alkyl sulfonic acids, or the like. Illustrative of the latter types of strong organic acid are p-toluenesulfonic acid, benzenesulfonic acid, 1,3,5-trimethylbenzenemonosulfonic acid, o-xylenesulfonic acid, fluorobenzene-4-sulfonic acid, o-dichlorobenzene-4-sulfonic acid, nitrobenzene-3-sulfonic acid, amylsulfonic acid, etc. Instead of a strong organic acid, there may be employed still more simply as the catalyst a strong non-reducing mineral acid, such as a hydrohalogen acid, e. g., hydrofluoric acid, or a mineral oxyacid, like sulfuric acid, which is preferred, or metaphosphoric acid, pyrophosphoric acid, selenic acid, tungstic acid, or orthophosphoric acid, which oxy-acid preferably contains the characterizing element (e. g., P, S, Se, W, etc.) at its highest valence or oxidation level, in general the acids of this latter character having the particular advantages of availability at low cost, high effectiveness as catalysts for the desired reaction, and properties (e. g., solubility characteristics, acid strength, etc.) which adapt them to effective utilization in the process.

As indicated hereinbefore, the process of the invention is based in part upon the unforeseen discovery that organic hydroperoxides, particularly alkyl hydroperoxides of the tertiary alkyl variety, can be prepared in an improved manner, with greater yields and higher purity of product, and with more efficient utilization of the hydrogen peroxide reagent, than have been obtained in the prior art processes, by reacting in aqueous liquid phase alcohols which preferably are of the tertiary class, with hydrogen peroxide in the presence of critical, small regulated amounts of an acidic catalyst, which catalyst may be added as such to the reaction mixture or may be generated in situ by addition to the reaction mixture of a compound or material which will generate acid therein. In accordance with this aspect of the invention it is essential that the reaction between the alcohol and the hydrogen peroxide be conducted throughout in the presence of an amount of acid not over an amount corresponding to the critical limit of 0.40 mole of acid per mole of the alcohol reactant and most desirably not over about 0.25 mole per mole of the alcohol reactant. The minimum amount of the acid appears to be somewhat less critical provided there is present a sufficient amount of the acid to catalyze the desired reaction. Appreciable reaction may be obtained by conducting the reaction in the presence of as little as 0.005 mole of the acid per mole of the alcohol reactant, a preferred minimum being about 0.02 mole of the acid per mole of the alcohol reactant.

The relative proportion of the hydrogen peroxide and alcohol reactants is subject to reasonable variation. Generally speaking, there is employed at least about 0.5 mole of hydrogen peroxide per mole of the alcohol reactant, and the hydrogen peroxide preferably is employed in an amount at least molecularly equivalent to the amount of the alcohol reactant. Although the use of excess hydrogen peroxide determined on the basis of the theoretical requirements of the reaction would a priori appear to be uneconomic and hence to be avoided, we have surprisingly found that the presence of a moderate excess of said hydrogen peroxide not only adds no significant cost to the operation but, in fact, actually increases the effectiveness and efficiency of the operations due to a favorable influence upon the yield and conversion relations that are obtained. In other words, by conducting the reaction in the presence of the critical, small amounts of an acidic catalyst, as hereinbefore explained, with the added feature of applying a moderate regulated excess of hydrogen peroxide even more efficient and selective production of the desired organic hydroperoxide compound is realized than, other conditions being equal, in the absence of such a moderate regulated excess of hydrogen peroxide. It is advantageous to employ an amount of the hydrogen peroxide from 125% up to about 250% of the calculated amount, there preferably being employed an excess of from about 40% to about 90% over the theoretical requirement of the reaction.

The temperatures that are employed in the process of the invention may be substantially above those employed in the known processes for the preparation of organic hydroperoxides by reacting alkyl hydrogen sulfate compounds with hydrogen peroxide. The temperature in some cases may be as high as 90° C., although maximum temperatures of about 70° C. are preferred. Minimum temperatures as low as about −10° C. or below are suitable, depending upon the freezing temperature of the reaction mixtures. When the reaction temperature is within the preferred range of from about 40° C. to about 70° C., there is obtained the singular advantage that reaction times as short as 5 minutes often are adequate and reaction times of from as little as 10 to no more than 30 minutes generally afford substantial formation of the desired hydroperoxide compound. Longer reaction times appear to do no particular harm. In general, the reaction time may be varied as the particular reactants, the particular catalyst, and other conditions of the process warrant.

The process of the invention may be carried out in a batchwise, an intermittent, or a continuous manner. It is better adapted in general to continuous operations than are the prior art processes for the preparation of the present hydroperoxide products, for the reason that the small amounts of catalyst, the short reaction times that are possible, and the more efficient conversions to desired hydroperoxide product all contribute substantially to improved efficiency and economy of continuous operations. In batchwise operations, the alcohol reactant, the hydrogen peroxide, which conveniently may be furnished in the form of an aqueous solution having an $H_2O_2$ content of from about 30% to about 50% or more by weight, and the catalyst may be mixed in any order in the hereinbefore indicated proportions, and the reaction allowed to proceed. Inert water-immiscible organic solvents, which preferably having boiling points below the boiling point of the hydroperoxidic product and may be paraffinic hydrocarbons, aromatic hydrocarbons, or preferably, halogen-substituted lower paraffins, such as ethylene chloride, methylene chloride, or chloroform, may be included in the reaction mixture.

Any suitable apparatus may be employed, at least the surfaces thereof which are in contact with the reaction mixture being constructed of some suitable corrosion-resistant material, such as glass, porcelain, stainless steel, tantalum, etc. For continuous operation, the preferred equipment comprises essentially a reaction tube or pipe surrounded by a fluid heat-control bath and through which the reaction mixture is passed. The size and length of the tube and the flow rate of the reaction mixture are correlated according to the necessary reaction time. Effluent from the reaction tube is passed to a separator wherein organic product phase is separated from aqueous phase according to known methods. Unreacted hydrogen peroxide and/or unreacted alkylating agent may be reutilized or recycled. Water-immiscible organic solvent which may have been added, if it has a boiling point below that of the hydroperoxide product, may be stripped or distilled from the organic phase, preferably under reduced or sub-atmospheric pressure. For many purposes, the purity of the organic product phase is such that the organic product phase can be directly utilized without the intervening tedious and expensive step of neutralization of the product, heretofore required.

The following examples are presented as being illustrative of the invention and without intent that they shall be construed as limiting the invention as it is more broadly disclosed and claimed herein.

Example I

Tertiary-butyl alcohol and a 50% by weight solution of hydrogen peroxide in water are mixed in a glass-lined open reaction vessel which is provided with a suitable stirring device and a thermometer, and is surrounded by a fluid temperature-regulating bath. The amounts of tertiary-butyl alcohol and hydrogen peroxide mixed correspond to a molar ratio $t-C_4H_9OH:H_2O_2$ of 1:1. For each mole of tertiary-butyl alcohol there then is added to the mixture 0.0169 mole of silicotungstic acid and the mixture is stirred to accelerate solution of the silicotungstic acid. As the reaction progresses, a water-immiscible organic phase consisting essentially of tertiary-butyl hydroperoxide separates, and when it no longer increases in amount the reaction is terminated. The tertiary-butyl hydroperoxide is separated by decantation from the aqueous phase. Traces of product (about 5% of the total) remaining dissolved or suspended in the aqueous phase are extracted with chloroform and combined after evaporating off the solvent, with the principal portion of the product.

The tertiary-butyl hydroperoxide product thus prepared is found by analysis to have a purity of 96% based upon all reaction products present. The amount of tertiary-butyl hydroperoxide corresponds to a conversion of hydrogen peroxide to desired product equal to 89% of that theoretically possible.

Example II

A similar experiment is carried out employing boron trifluoride in the form of its complex with diethyl ether as the catalyst. The boron trifluoride-ether complex is dissolved in tertiary-butyl alcohol to form a solution containing about 0.3 mole of $BF_3$ per mole of tertiary-butyl alcohol, the temperature being held at about 0° C. To the solution there is added slowly and with stirring a 50% solution of hydrogen peroxide in water, in an amount to give a molar ratio $t-C_4H_9OH:H_2O$ equal to unity. During the addition of the hydrogen peroxide, the temperature of the mixture is kept at about 0° C. The mixture then is warmed to about 25° C., held with stirring at this temperature for about three hours, and the organic product phase and the aqueous phase separated. According to the method described in the preceding example, tertiary-butyl hydroperoxide is recovered in an amount corresponding to a yield of 90% of theory, based upon the hydrogen peroxide consumed.

Example III

A solution of para-toluenesulfonic acid in a 50% aqueous solution of hydrogen peroxide is prepared, at a concentration of 0.2 mole para-toluenesulfonic acid per mole of $H_2O_2$. The solution is mixed, with stirring and at 60° C., with one mole of tertiary-butyl alcohol per mole of the hydrogen peroxide and held with stirring at about 60° C. for 52 minutes. According to the method employed in the preceding examples tertiary-butyl hydroperoxide is obtained in an amount corresponding to a yield of 90% based upon total products formed.

Example IV

There is prepared a mixture of tertiary-butyl alcohol and hydrogen peroxide (added as a 50% by weight solution in water) in proportions corresponding to a mole ratio $t-C_4H_9OH:H_2O_2$ of 1:1.5. To the mixture there is added at about 60° C. and with agitation 0.25 mole of 70% sulfuric acid per mole of the alcohol. After 120 minutes at about 60° C., the reaction is terminated by rapid cooling of the entire mixture and the tertiary-butyl hydroperoxide, which is present as a water-immiscible phase, is separated. Traces of product remaining in the aqueous phase are extracted as in Example I and combined with the separated product phase. The amount of the tertiary-butyl hydroperoxide obtained corresponds to a conversion of hydrogen peroxide to product equal to 82% of theory. The yield of the product, based upon all reaction products, is found by anaylsis to be 95%.

*Example V*

The reaction between tertiary-amyl alcohol and hydrogen peroxide is effected by mixing tertiary-amyl alcohol, a 50% solution of hydrogen peroxide in water, and 70% aqueous sulfuric acid in proportions corresponding to a mole ratio $t\text{-}C_5H_{11}OH:H_2SO_4$ equal to 1.0:0.3 and to a mole ratio $t\text{-}C_5H_{11}OH:H_2O_2$ equal to 1.0:0.97, and maintaining the mixture with agitation at 50° C. for one hour. At the end of the hour, the mixture is cooled to room temperature, the supernatant organic phase separated by decantation and analyzed. The tertiary-amyl hydroperoxide is obtained in a conversion of applied hydrogen peroxide to product equal to 68% and in a yield of 92.4% based upon all reaction products present. Traces of sulfuric acid and hydrogen peroxide remaining in the organic phase, if objectionable, may be removed by washing with an aqueous suspension of calcium carbonate, then with water alone, and drying.

*Example VI*

While the results described in the preceding example are notably superior to those obtained in the published prior art synthesis of tertiary-amyl hydroperoxide, an even more pure product can be obtained by conducting the reaction in the presence of an inert water-immiscible organic solvent, such as benzene. For example, there is prepared a mixture of tertiary-amyl alcohol, a 50% solution of hydrogen peroxide in water, and 70% aqueous sulfuric acid in the mole ratios employed in Example V, and to the mixture there is added an equal volume of benzene. The mixture then is maintained with agitation at 50° C. for one hour, and cooled. The benzene layer then is removed by decantation and analyzed. The conversion to product of $H_2O_2$ applied is found to be 67%. The tertiary-amyl hydroperoxide is found to be the only product present, both in the benzene layer and in the aqueous phase. In other words, by employing the small regulated amount of acidic catalyst and, in addition, conducting the reaction in the presence of an inert organic solvent, a quantitative yield of tertiary-amyl hydroperoxide is obtained. As far as we are aware, this is the first time that this result has been achieved in the synthesis of tertiary-alkyl hydroperoxides by the alkylation of hydrogen peroxide in an aqueous medium in the presence of an acidic catalyst.

While the process has been specifically exemplified by the preparation of tertiary-butyl hydroperoxide and tertiary-amyl hydroperoxide, which are products of distinctive value in various applications, other organic hydroperoxides may be prepared advantageously according to the method of the invention. The organic hydroperoxides which are obtainable according to the invention contain, as a general characteristic, a hydroperoxy radical (—O—O—H) that is directly linked to a carbon atom that is of the aliphatic variety (including cycloaliphatic) and is directly linked by univalent bonds to three atoms, particularly carbon and hydrogen, in addition to the hydroperoxy radical. Organic hydroperoxides which are of particular value and utility, in the production of which the problem of obtaining a product of adequate purity has been especially vexatious, and to the preparation of which in a state of high purity the process of the invention is especially suited, are the organic hydroperoxides of the tertiary-alkyl variety, that is, the organic hydroperoxides in which the organic radical contains a tertiary carbon atom and is directly linked to the oxygen atom of the hydroperoxy radical by a bond of a tertiary carbon atom, said organic radical preferably being an unsubstituted tertiary alkyl radical. These organic hydroperoxides include, in addition to tertiary-butyl hydroperoxide and tertiary-amyl hydroperoxide, their various higher homologs and analogs wherein the hydroperoxy radical is directly linked to a tertiary carbon atom, such as 2-isopropylisopropyl hydroperoxide, 2-propylisopropyl hydroperoxide, 2-t-butylisopropyl hydroperoxide, and the like, and their homologs and analogs and various substitution products. Illustrative of the alcohols which may be employed advantageously according to the process of the invention for the preparation of valuable hydroperoxides are tertiary-butyl alcohol, tertiary-amyl alcohol, dimethylpropylcarbinol, methyldiethylcarbinol, triethylcarbinol, diethylpropylcarbinol, as well as their various analogs and homologs and substitution products, e. g., their suitable halo substitution products, i. e., their chloro and their bromo substitution products. In the foregoing examples, there can be substituted for the tertiary-butyl alcohol and tertiary-amyl alcohol, other alcohols, such as tertiary alcohols preferably represented by the tertiary-hexanols, the tertiary-heptanols, 1-methylcyclohexanol, and like aliphatic and cycloaliphatic, preferably saturated, alcohols, as well as even primary and secondary alcohols, such as ethanol, isopropanol, isobutanol, methylisobutylcarbinol, cyclohexanol, and the like. In each case there is obtained a greater efficiency in the conversion of hydrogen peroxide to the desired corresponding hydroperoxide product, and the hydroperoxide product is obtained in higher yields, i. e., with less formation of by-products, than by alkylation of hydrogen peroxide according to the known prior art methods in the presence of the customary large amounts of acidic catalyst.

We claim as our invention:

1. A process for the production of tertiary-butyl hydroperoxide, said process being characterized by high yields of desired hydroperoxide product and high conversions of hydrogen peroxide reactant to said hydroperoxide product, which comprises mixing in liquid phase tertiary-butyl alcohol, a concentrated aqueous solution of hydrogen peroxide and silico tungstic acid in proportions corresponding to a molar excess, from about 40% to about 90% over the amount theoretically required, of hydrogen peroxide relative to the tertiary-butyl alcohol and to from 0.005 to not over 0.4 mole of silico-tungstic acid per mole of tertiary-butyl alcohol, and reacting the tertiary-butyl alcohol with the hydrogen peroxide in the resulting aqueous mixture in the presence of the silico-tungstic acid at a temperature within the range of from about 40° C to about 70° C. to produce tertiary-butyl hydroperoxide.

2. A process for the production from tertiary-butyl alcohol of tertiary-butyl hydroperoxide, said process being characterized by high yields of desired hydroperoxide product and high conversions of hydrogen peroxide reactant to said hydroperoxide product, which comprises mixing in liquid phase tertiary-butyl alcohol, a concentrated aqueous solution of hydrogen peroxide, and a heteropoly acid in proportions corresponding to a molar excess up to about 250% of the amount theoretically required, of hydrogen peroxide relative to the tertiary-butyl alcohol and to from 0.005 to not over 0.4 mole of the heteropoly acid per mole of tertiary-butyl alcohol, and reacting the tertiary-butyl alcohol with the hydrogen peroxide in the resulting aqueous mixture in the presence of the heteropoly acid at a temperature within the range of from about 40° C. to about 70° C. to produce tertiary-butyl hydroperoxide.

3. A process for the selective production from tertiary butyl alcohol of tertiary-butyl hydroperoxide, said process being characterized by high yields of desired hydroperoxide product and high conversions of hydrogen peroxide reactant to said hydroperoxide product, which consists of the steps of mixing in liquid phase tertiary-butyl alcohol, an aqueous solution of hydrogen peroxide having a concentration of from about 30% to about 50% by weight $H_2O_2$, and a strong mineral acid in proportions corresponding to a molar excess, from about 40% to about 90% over the amount theoretically required, of hydrogen peroxide relative to the tertiary-butyl alcohol and to from 0.005 to not over 0.4 mole of strong acid per mole of tertiary-butyl alcohol, reacting the tertiary butyl alcohol with the aqueous solution of the hydrogen peroxide in the presence of the strong mineral acid at a temperature within the range of from about 40° C. to about 70° C. and then decanting the tertiary butyl hydroperoxide from the resulting aqueous mixture.

4. A process for the selective production from an alcohol of the tertiary-alkyl variety of an organic hydroperoxide of the tertiary-alkyl variety, said process being characterized by high yields of desired hydroperoxide product and high conversions of hydrogen peroxide reactant to said hydroperoxide product, which consists of the steps of mixing in liquid phase an alcohol of the tertiary-alkyl variety, an aqueous solution of hydrogen peroxide having a concentration of from about 30% to about 50% by weight of $H_2O_2$ and a strong mineral acid in proportions corresponding to upwards from about 0.5 mole of hydrogen peroxide per mole of the said alcohol and to from 0.005 to not over 0.4 mole of the strong mineral acid per mole of the said alcohol, reacting the alcohol with the aqueous solution of the hydrogen peroxide in the presence of the strong mineral acid at a temperature up to about 90° C. and then separating the organic hydroperoxide of the tertiary-alkyl variety from the resulting aqueous mixture.

5. An improved process for the production of tertiary-butyl hydroperoxide by reaction of tertiary-butyl alcohol with hydrogen peroxide, said process being characterized by high yields of desired hydroperoxide product and high conversions of hydrogen peroxide reactant to said hydroperoxide product, which consists of the steps of treating in liquid phase tertiary-butyl alcohol with an aqueous solution of hydrogen peroxide having a concentration of from about 30% to about 50% by weight of $H_2O_2$ in the presence of a small regulated amount of a strong acid present in an amount within the range of from 0.005 to not over 0.4 mole per mole of the tertiary-butyl alcohol, and then separating tertiary-butyl hydroperoxide from the resulting aqueous reaction mixture.

6. An improved process for the production of an organic hydroperoxide wherein the hydroperoxy radical is directly linked to a carbon atom which is linked to other atoms by univalent bonds only, said process being characterized by high yields of desired hydroperoxide product and high conversions of hydrogen peroxide reactant to said hydroperoxide product, which consists of the steps of treating an alcohol wherein the hydroxyl radical is directly linked to a carbon atom which is linked to other atoms by univalent bonds only in liquid phase with an aqueous solution of hydrogen peroxide having a concentration of from about 30% to about 50% by weight of $H_2O_2$ in the presence of a small regulated amount of strong acid present in an amount within the range of from 0.005 to not over 0.4 mole per mole of said alcohol, and then separating said hydroperoxide from the resulting aqueous reaction mixture.

7. The process defined by claim 3 in which the strong mineral acid is sulfuric acid.

8. The process defined by claim 4 in which the strong mineral acid is sulfuric acid.

9. The process defined by claim 6 in which the strong acid is sulfuric acid.

EDWARD R. BELL.
WILLIAM E. VAUGHAN.

REFERENCES CITED

The following references are of record in the file of this patent:

UNITED STATES PATENTS

| Number | Name | Date |
|---|---|---|
| 2,176,407 | Milas | Oct. 17, 1939 |